(12) United States Patent
Huang

(10) Patent No.: US 9,028,565 B2
(45) Date of Patent: May 12, 2015

(54) COMPOSITE SEPARATOR FOR USE IN A LITHIUM ION BATTERY ELECTROCHEMICAL CELL

(75) Inventor: Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 13/562,432

(22) Filed: Jul. 31, 2012

(65) Prior Publication Data

US 2014/0038024 A1     Feb. 6, 2014

(51) Int. Cl.
  *H01M 2/14*   (2006.01)
  *H01M 2/16*   (2006.01)
  *H01M 6/00*   (2006.01)

(52) U.S. Cl.
  CPC .............. *H01M 6/00* (2013.01); *H01M 2/1646* (2013.01); *H01M 2/145* (2013.01); *H01M 2/14* (2013.01); *H01M 2/1606* (2013.01); *H01M 2/16* (2013.01)

(58) Field of Classification Search
  CPC ......... H01M 2/14; H01M 2/145; H01M 2/16; H01M 2/1606; H01M 2/1646
  USPC ......... 429/247, 145, 144, 254, 255; 29/623.1, 29/623.2, 623.3, 623.4, 623.5; 427/77; 428/339; 361/500, 502
  See application file for complete search history.

(56) References Cited

U.S. PATENT DOCUMENTS

| 2005/0053840 A1* | 3/2005 | Jo et al. ........................ 429/247 |
| 2008/0305389 A1* | 12/2008 | Arora et al. ................... 429/145 |
| 2010/0195270 A1* | 8/2010 | Hayakawa et al. ........... 361/502 |
| 2011/0157771 A1* | 6/2011 | Gibson et al. ................. 361/500 |
| 2011/0217595 A1* | 9/2011 | Kelnberger et al. .......... 429/248 |

OTHER PUBLICATIONS

U.S. Appl. No. 13/407,893, filed Feb. 29, 2012; Title: "Electrode-Separator Integral Segment for a Lithium Ion Battery".
U.S. Appl. No. 13/488,691, filed Jun. 5, 2012; Title: "Non-Woven Polymer Fiber Mat for Use in a Lithium Ion Battery Electrochemical Cell".

* cited by examiner

*Primary Examiner* — Kenneth Douyette
(74) *Attorney, Agent, or Firm* — Reising Ethington P.C.

(57) ABSTRACT

A composite separator and a method of making a composite separator are disclosed. The composite separator includes one or more electrospun polymer fibers and ceramic particles. And the method of making a composite separator includes electrospinning a first non-woven polymer fiber mat, applying ceramic particles over the first non-woven polymer fiber mat, and then electrospinning a second non-woven polymer fiber mat over the first non-woven polymer fiber mat and the ceramic particles. Once formed, the composite separator may be incorporated into an electrochemical battery cell of a lithium ion battery.

20 Claims, 4 Drawing Sheets

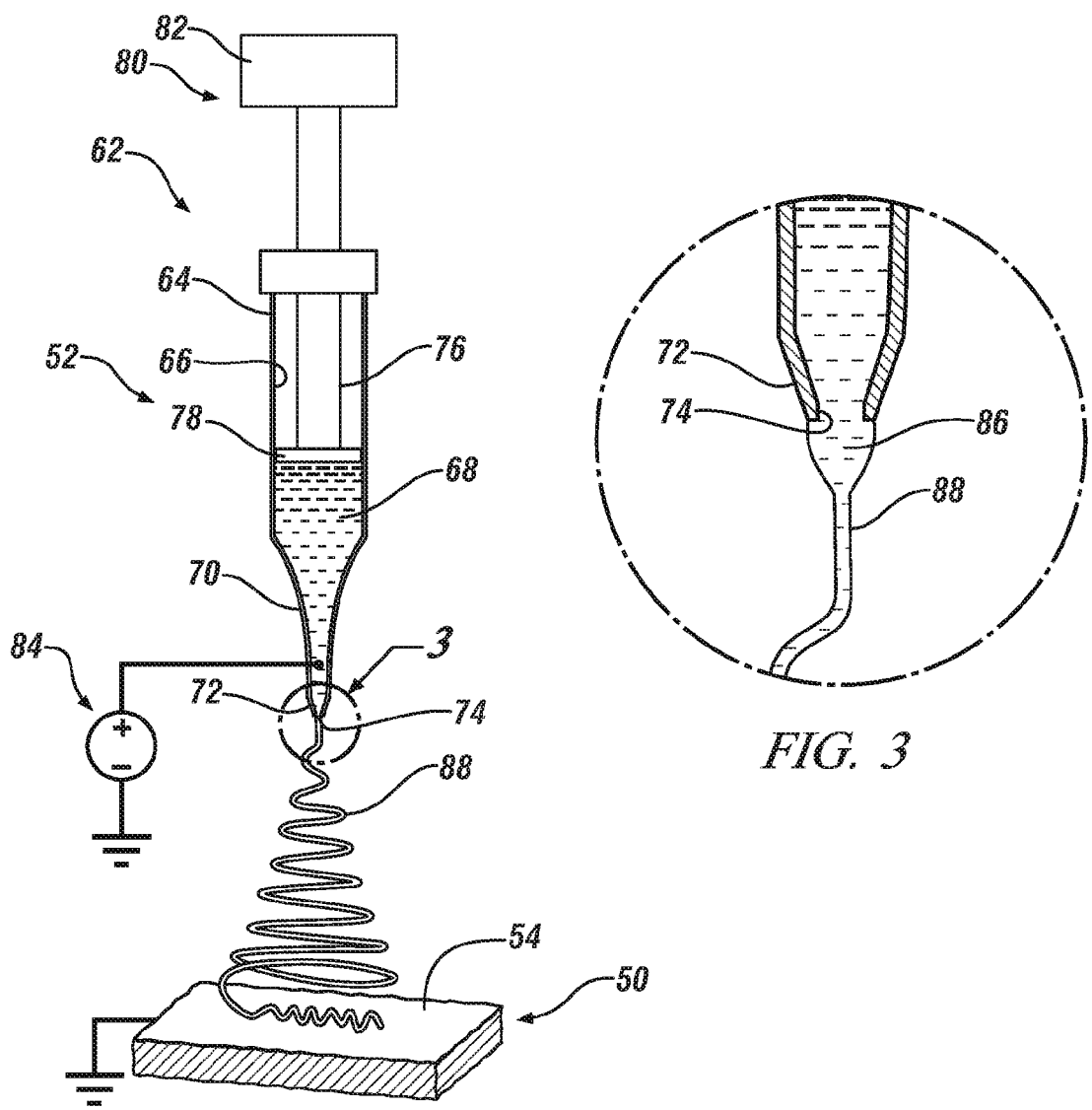
FIG. 2
FIG. 3
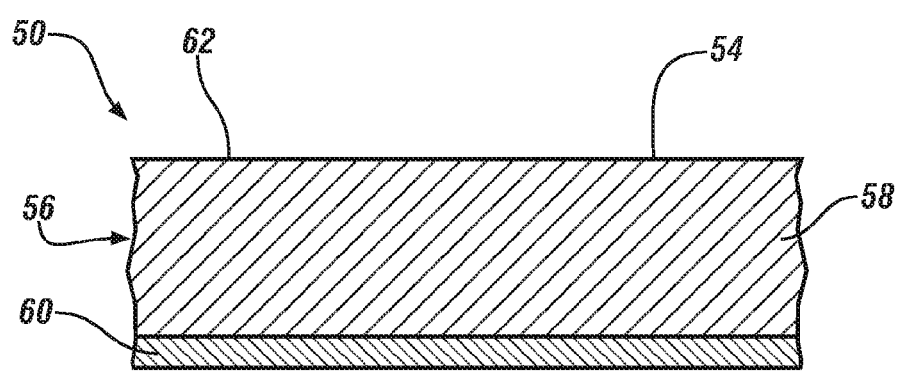
FIG. 4

COMPOSITE SEPARATOR FOR USE IN A LITHIUM ION BATTERY ELECTROCHEMICAL CELL

TECHNICAL FIELD

The technical field of this disclosure relates generally to a secondary lithium ion battery and, more specifically, to a composite separator that may be disposed between a negative electrode and a positive electrode in an electrochemical battery cell of a lithium ion battery.

BACKGROUND

A lithium ion battery generally contains one or more electrochemical battery cells. Each battery cell typically includes a negative electrode, a positive electrode, and a separator situated between the electrodes. The separator facilitates operation of the electrochemical battery cell by providing a porous and electrically-insulative physical barrier between confronting faces of the two electrodes as is generally well understood in the art. A typical separator design, for instance, seeks a thin polymer structure that has a porosity sufficient to contain a liquid electrolyte that can communicate lithium ions while, at the same time, remains thermally, chemically, and mechanically stable enough to separate the confronting faces of the negative and positive electrodes over the course of many discharge/charge cell cycles so that a short-circuit is prevented. The most commonly used separators today are an extruded porous polyolefin sheet membrane—such as those made from polyethylene or polypropylene—or a laminate of several extruded porous polyolefin sheet membranes. Uniaxial or biaxial stretching is often relied upon during manufacture of the polyolefin sheet membranes(s) to promote the requisite porosity.

A conventional polyolefin sheet membrane, however, is potentially susceptible to certain performance declines when heated excessively. Exposure of the electrochemical battery cell to high temperatures associated with charging-phase heat generation, ambient atmospheric conditions, or some other source, for example, can cause the polyolefin sheet membrane to shrink, soften, and even melt. Such physical distortions of a polyolefin sheet membrane may ultimately permit the electrochemical battery cell to short-circuit through direct electrical contact between the confronting faces of the negative and positive electrodes. Battery thermal runaway is also a possibility if the electrodes come into direct electrical contact with one another to an appreciable extent. The tendency of an extruded and stretched polyolefin sheet membrane to lose some thermal stability for prolonged periods is a potential concern for some lithium ion battery applications.

A porous sheet membrane constructed from one of several types of engineering polymers that exhibit better thermal stability than a polyolefin could potentially enhance the temperature operating window of an electrochemical battery cell and, consequently, the lithium ion battery. But the techniques often used to make a porous polyolefin sheet membrane generally cannot transform the various types of engineering polymers into a sheet membrane that exhibits sufficient porosity across its thickness at reasonable costs. The stretching techniques used to make a polyolefin sheet membrane have also been shown to adversely affect the dimensional stability of a sheet membrane formed from certain engineering polymer materials when exposed elevated temperatures above 80° C. and, more noticeably, above 100° C. For example, when heated to such temperatures, a sheet membrane constructed from an engineering polymer may shrink in the direction that it was previously stretched.

SUMMARY OF THE DISCLOSURE

A sufficiently porous and operationally stable composite separator and a method of making such a composite separator are disclosed. The composite separator includes a first major face and a second major face that define its thickness. The composite separator comprises one or more electrospun polymer fibers (also referred to as "polymer fiber(s)" for brevity) and ceramic particles. The polymer fiber(s) may be composed from any of a robust array of polymer materials—both commodity polymers and engineering polymers—and the ceramic particles may be composed of any desired ceramic material. Within the composite separator, the polymeric fiber(s) are present adjacent to the first and second major faces in a greater weight percent than the ceramic particles based on the total weight of the fibers and the particles. And the ceramic particles are concentrated within the composite separator, preferably as an intermediate layer situated between the first and second major faces. The ceramic particles are not, consequently, homogeneously dispersed throughout the composite separator.

A method of making the composite separator includes electrospinning a first non-woven polymer fiber mat, applying ceramic particles over the first non-woven polymer fiber mat, and then electrospinning a second non-woven polymer fiber mat over the first non-woven polymer fiber mat and the ceramic particles. The ceramic particles—depending on their size and amount—may accumulate and form an intermediate ceramic particle layer situated between a top surface of the first non-woven polymer fiber mat and a bottom surface of the second non-woven polymer fiber mat, or they may infiltrate the first and/or second non-woven polymer fiber mats and form a dispersal of ceramic particles having a concentration gradient in which the weight percent of the particles (based on the ceramic particles and polymer fiber(s)) diminishes towards the first and/or second major faces, or they may do both. Each of these embodiments results in the ceramic particles being more concentrated within the composite separator—and not so much at the major faces—after the second non-woven polymer fiber mat is electrospun in place.

BRIEF DESCRIPTION OF THE DRAWINGS

FIG. 2 is a generalized diagrammatic illustration of an electrospinning apparatus that may be used to fabricate a first non-woven polymer fiber may and a second non-woven polymer fiber mat during fabrication of the composite separator shown schematically in FIG. 1;

FIG. 3 is a magnified and generalized illustration of a Taylor cone held at the tip of the tubular nozzle of the electrospinning apparatus depicted in FIG. 2;

FIG. 4 is a generalized and schematic illustration of one embodiment of a collector substrate onto which a first non-woven polymer fiber mat may be formed by the electrospinning apparatus;

DETAILED DESCRIPTION

Figure 1:
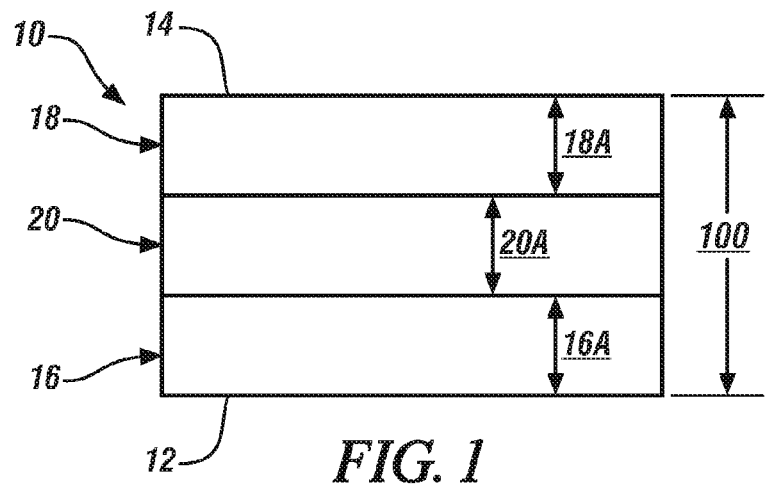
FIG. 1 is a generalized and schematic cross-sectional illustration of a composite separator that may be used in an electrochemical battery cell of a lithium ion battery.

A composite separator 10 that may be used in an electrochemical battery cell of a lithium ion battery is shown generally and schematically in FIG. 1. The composite separator 10 may be situated by itself between opposed confronting faces of a negative electrode and a positive electrode of the electrochemical battery cell or, alternatively, the composite separator 10 may be combined with other material layers. These other material layers may include, for example, another similarly constructed composite separator formed of the same or different materials, a conventional polyolefin sheet membrane layer, or any other appropriate material layer that a skilled artisan would like to combine with the composite separator 10 to achieve a desired performance effect. Skilled artisans will appreciate, as will be further explained below, that the composite separator 10 may be fabricated as a "freestanding" structure or as part of an electrode-separator integral segment.

The composite separator 10 includes a first major face 12 and a second major face 14. The first and second major faces 12, 14 define a thickness 100 of the composite separator 10 which, in a preferred embodiment, lies between about 10 µm and about 50 µm, between about 10 µm and about 35 µm, or between about 15 µm and about 25 µm. Each of the first and second major faces 12, 14 is intended to be facially oriented towards—and preferably engaged with—spaced apart and confronting surfaces of a negative electrode and a positive electrode in order to keep the two electrodes physically separated and electrically insulated. Included within the composite separator 10 are one or more electrospun polymer fibers and ceramic particles. The polymer fiber(s) and the ceramic particles may be the only materials present in the composite separator 10, if desired, or other materials may be present even though not specifically mentioned here.

The composite separator 10 comprises several cross-sectional regions that are distinguished by their contents. A first edge region 16 and second edge region 18 that lie adjacent to the first and second major faces 12, 14, respectively, include a greater weight percent of the polymer fiber(s) than the ceramic particles based on the total weight of the fiber(s) and the particles. And an intermediate region 20 situated between the first and second edge regions 16, 18 includes a greater weight percent of the ceramic particles than both the first and second edge regions 16, 18 when considered individually and, preferably, when considered in the aggregate, also based on the total weight of the fiber(s) and particles. The edge regions 16, 18 and the intermediate region 20 are shown here as distinct idealized regions because FIG. 1 is merely a schematic representation. In reality, however, sharp interfaces may not be found between adjacent regions; rather, the intermediate region 20 and each edge region 16, 18 will likely be intermingled together along their respective interfaces as will be appreciated by skilled artisans.

The first and second edge regions each have a thickness 16A, 18A that encompasses about 5% to about 40% of the thickness 100 of the composite separator 10 starting from their respective major face 12, 14 and moving inward, while the intermediate region 20 has a thickness 20A that typically encompasses the middle 20% to 90% of the composite separator 10 and extends between the first and second edge regions 16, 18. A preferred thickness breakdown of the various regions 16, 18, 20 in the composite separator 10 sets the thickness 16A of the first edge region 16 between about 10% and about 30% of the thickness of the composite separator 10, sets the thickness 18A of the second edge region 18 between about 10% and about 30% of the thickness of the composite separator 10, and sets the thickness 20A of the intermediate region 20 between about 40% and about 80% of the thickness of the composite separator 10.

The weight percents of the polymer fiber(s) and the ceramic particles present in each region 16, 18, 20 can be tailored to meet the demands of the particular electrochemical battery cell in which the composite separator 10 will be used. For example, in a preferred embodiment, the intermediate region 20 includes anywhere from 30 wt. % to about 100 wt. % of the ceramic particles and about 0 wt. % to about 70 wt. % of the polymer fiber(s) (again, based on the weight of the polymer fiber(s) and the ceramic particles). The first and second edge regions 16, 18, on the other hand, include anywhere from about 0 wt. % to about 80 wt. % of the ceramic particles and from about 20 wt. % to about 100 wt. % of the polymer fiber(s) keeping in mind that the weight percent of the ceramic particles in the each of the first and second edge regions 16, 18 is lesser than the weight percent of the ceramic particles in the intermediate region 20. In a specific and exemplary embodiment of the composite separator 10, the intermediate region 20 includes about 60 wt. % to about 90 wt. % of ceramic particles, and the first edge region 16 and the second edge region 18 each include about 0 wt. % to about 30 wt. % of ceramic particles and about 70 wt. % to about 100 wt % of the polymer fiber(s).

Figure 1A:
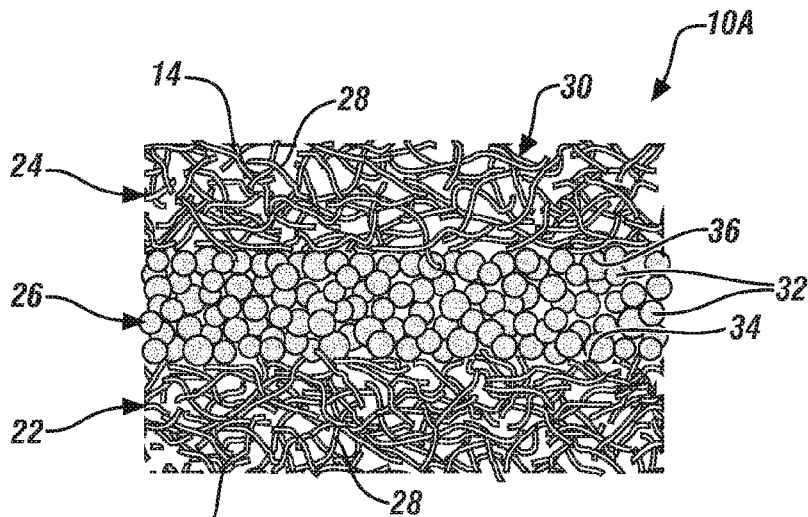
FIG. 1A is a generalized cross-sectional illustration of an embodiment of the composite separator shown schematically in FIG. 1.

One embodiment of the composite separator 10, shown generally in FIG. 1A and identified as numeral 10A, includes a first non-woven polymer fiber mat 22, a second non-woven polymer fiber mat 24, and an intermediate ceramic particle layer 26 situated between the first and second non-woven polymer fiber mats 22, 24. Each of the non-woven polymer fiber mats 22, 24 comprises one or more electrospun polymer fibers 28 assembled into a fibrous web 30 of preferably random arrangement. As for the ceramic particle layer 26, it comprises a collection of ceramic particles 32 that preferably separate the non-woven polymer fiber mats 22, 24 from one another. Forming a ceramic particle layer 26 of this kind may be accomplished by using a quantity of ceramic particles 32 that are large enough to remain generally confined, as a whole, between on a top surface 34 of the first non-woven polymer fiber mat 22 and a bottom surface 36 of the second non-woven polymer fiber mat 24. Such particles are less likely to permeate into the first or second non-woven polymer fiber mats 22, 24—although some may—and are therefore more inclined to establish and maintain the intermediate ceramic particle layer 26. With brief reference to FIG. 1, the first non-woven polymer fiber mat 22 corresponds to the first edge region 16, the second non-woven polymer fiber mat 24 corresponds to the second edge region 18, and the intermediate ceramic particle layer 26 corresponds to the intermediate region 20.

The one or more electrospun polymer fibers 28 included in the first and second non-woven polymer fiber mats 22, 24 are nanometer- to micrometer-sized in diameter. The diameter of the polymer fiber(s) 28, for example, may be about 10 nm to about 10 µm, about 50 nm to about 2 µm, or about 50 nm to about 1 µm. Having such a small-diameter provides the polymer fiber(s) 28 with sufficient flexibility and strength, a high surface area to mass ratio, and an ability to define a tortuous porous structure within the fibrous web 30 contained in each non-woven polymer fiber mat 22, 24. The ability to define a tortuous porous structure can, in turn, when the composite separator 10A is incorporated into an electrochemical battery cell as all or part of a separator, help distribute a soaked liquid electrolyte throughout the composite separator 10A so that lithium ions can be passed between the electrodes coextensively through the separator 10A, and also prevent lithium dendrites from growing unhindered at the negative electrode and reaching the positive electrode, to name but a few performance-related contributions.

The polymer fiber(s) 28 are preferably comprised of a polymer material suitable for use in an electrochemical battery cell of a lithium ion battery and, additionally, one that is conducive to electrospinning. Some exemplary polymer materials that may be employed include a polyolefin (PO), a polyamic acid (PAA), a polyimide (PI), a polyamide (PA), a polysulfone (PS), a polyester (PE), a fluoropolymer (FP), a polyacrylate (PAC), an acrylic (AC), a polycarbonate (PC), a polyurethane (PU), and mixtures thereof. Specific and exemplary polymer materials encompassed by these polymer material families include polypropylene (PP), polyethylene (PE), polyetherimide (PEI), polyhexamethylene adipamide (nylon 6,6), polycaprolactam (nylon 6), an aromatic polyamide such as polyparaphenylene terephthalamide (i.e., Kevlar®), standard polysulfone (PSf) (reaction product of 2,2-bis (4-hydroxyl) propane and 4,4'-dichlorodiphenyl sulfone), polyarylsulfone (PAS), polyethersulfone (PES), polyphenylsulfone (PPSF), a thermoplastic polyester such as polyethylene terephthalate (PET), a liquid crystal polymer such as the polycondensation product of 4-hydroxybenzoic acid and 6-hydroxynaphthalene-2-carboxylic acid (i.e., Vectran®), polyvinylidene fluoride (PVdF), poly(methyl methacrylate) (PMMA), polyacrylonitrile (PAN), poly(bisphenol A-carbonate), and polyether- and polyester-based polyurethanes. PET, PAN, PEI, PSf, an aromatic polyamide such as Kevlar®, a liquid crystal polymer such as Vectran®, and PVdF are the most preferred polymer materials for making the electrospun polymer fiber(s) 28.

The ceramic particles 32 included in the intermediate ceramic particle layer 26—and possibly the first and second edge regions 16, 18—are also nanometer- to micrometer-sized in diameter. The diameters of the ceramic particles 32 are chosen so that the particles 32 are large enough to establish and maintain the intermediate ceramic particle layer 26 between the first and second non-woven polymer fiber mats 22, 24. Deciding what sized ceramic particles to use often depends on several factors including the thickness and density of the first and second non-woven polymer fiber mats 22, 24 and the diameter of the polymer fiber(s) 28. Typically, however, the ceramic particles 32 have diameters that fall somewhere between about 50 nm to about 5 µm, about 80 nm to about 3 µm, or about 200 nm to about 2 µm. Larger or smaller sized ceramic particles 32 may of course be used if necessary under the circumstances.

The ceramic particles 32 are preferably comprised of a ceramic material that is suitable for use in an electrochemical battery cell of a lithium ion battery. A wide range of ceramic materials are suitable for such an environment because ceramics, in general, are typically quite heat-resistance, electrochemically stable within the operating environment of an electrochemical battery cell of a lithium ion battery, and wettable by lithium ion battery liquid electrolytes. Some examples of preferred ceramic materials include barium titanate, strontium-doped barium titanate, alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, and mixtures thereof. Of these various suitable ceramic materials, however, alumina, silica, and ceria are favored because, on balance, they perform adequately and are generally widely available through numerous commercial sources at low relative cost. Barium titanate ($BaTiO_3$) and strontium-doped barium nitrate ($BaSrTiO_3$) are also preferred as they have strong positive thermal coefficients of resistivity and, as such, can serve as internal protectants against battery cell thermal runaway events.

In order to accommodate the internal communication of lithium ions, the non-woven polymer fiber mats 22, 24 and the intermediate ceramic particle layer 26 together provide the composite separator 10A with a porosity that traverses its thickness 100 and connects the opposed first and second major faces 12, 14. The term "porosity" as used here refers to the volume percentage of the composite separator 10A that is occupied by open space (i.e., pores) and is infiltratable by a liquid electrolyte that can communicate lithium ions. These pores may vary in size, shape, and spacing. But collectively they are generally small enough and sufficiently distributed to prevent contact between the confronting surfaces of the negative and positive electrodes the composite separator 10A is meant to separate, yet still large enough and adequately interconnected to contain a liquid electrolyte and facilitate lithium ion mobility. One or more of the size, relative volume, and composition of the polymer fiber(s) 28 and the ceramic particles 32 are preferably managed so that the composite separator 10A exhibits a porosity between about 30% and about 90%—more preferably between about 40% and about 70%. This degree of porosity is preferably distributed to allow the communication of lithium ions coextensively between the first and second major faces 12, 14.

The presence of the intermediate ceramic particle layer 26 between the first and second non-woven polymer fiber mats 22, 24 may achieve several beneficial effects. For instance, the intermediate ceramic particle layer 26 may structurally reinforce the composite separator 10A. It may also help improve the thermal and compressive strength of the composite separator 10A if the ceramic particles 32 chosen have good thermal and mechanical properties. Furthermore, the intermediate ceramic particle layer 26 may render manufacture of the composite separator 10A quicker and more efficient. This is because the intermediate ceramic particle layer 26 can be fabricated relatively fast by a variety of simple techniques when compared to the non-woven polymer fiber mats 22, 24. In other words, by including the ceramic particle layer 26 in the composite separator 10A, the non-woven polymer fiber mats 22, 24 are not required to be as thick and, consequently, less time is spent electrospinning them.

Figure 1B:
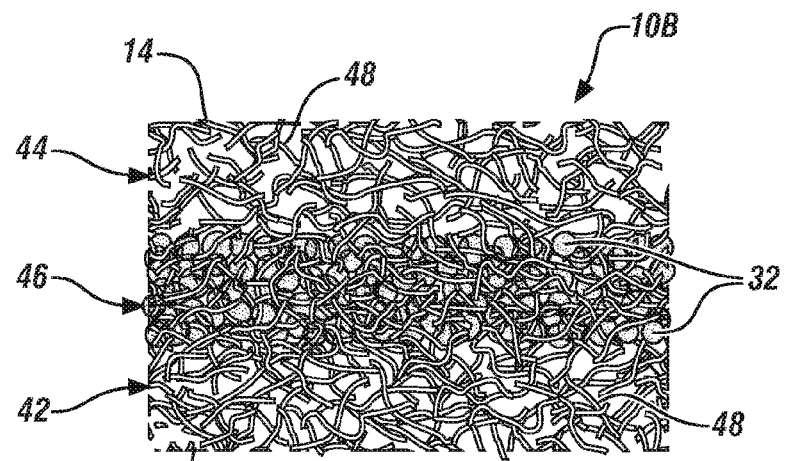
FIG. 1B is a generalized cross-sectional illustration of another embodiment of the composite separator shown schematically in FIG. 1.

Another embodiment of the composite separator 10, shown generally in FIG. 1B and identified as numeral 10B, includes a first non-woven polymer fiber mat 42 and a second non-woven polymer fiber mat 44. The two non-woven polymer fiber mats 42, 44 include one or electrospun polymer fibers 48 as before. But unlike the previous embodiment, the first and second non-woven polymer fiber mats 42, 44 are integrated together and, in some instances, do not have an easily observable interface, if they have one at all. The composite separator 10B shown here also includes a dispersal 46 of ceramic particles 32 located within one or both of the first and second non-woven polymer fiber mats 42, 44. A large proportion of those particles 32 are present near the middle of the composite separator 10B to form a ceramic particle-rich region between, but not immediately adjacent to, the first and second major faces 12, 14; that is, the ceramic particles 32 are less concentrated next to the first or second major faces 12, 14, although some of the particles 32 may indeed be present in those vicinities. Dispersing the ceramic particles 32 in this way may be accomplished by using particles 32 that are small enough to infiltrate either or both of the first and second non-woven polymer fiber mats 42, 44 and intermingle with the polymer fiber(s) 48. As for the composition of the polymer fiber(s) 48 and the ceramic particles 32, they are the same as before. So too is the porosity of the composite separator 10B.

The composite separator 10, with reference to the specific embodiments shown in FIGS. 1A and 1B, and related variations, may be fabricated by a method that includes: (1) electrospinning the polymer fiber(s) 28, 48 into the first non-woven polymer fiber mat 22, 42; (2) applying the ceramic particles 32 over a top surface of the first non-woven polymer fiber mat 22, 42; and (3) electrospinning the polymer fiber(s) 28, 48 into a second non-woven polymer fiber mat 24, 44 over the first non-woven polymer fiber mat 22, 42 and the ceramic particles 32. The first non-woven polymer fiber mat 22, 42 may be formed onto a collector substrate 50 by an electrospinning apparatus 52. The ceramic particles 32 may be applied over the top surface of the first non-woven polymer fiber mat 22, 42 by any suitable approach. The electrospinning apparatus 52 may then be used again to form the second non-woven polymer fiber mat 24, 44. The ceramic particles 32 may be applied in a way that forms an intermediate ceramic particle layer 26, as shown in FIG. 1A, or in a way that forms a dispersal 46 of the ceramic particles 32 in one or both of the first and second non-woven polymer fiber mats 42, 44 such that the concentration of the ceramic particles 32 diminishes towards the first and second major faces 12, 14 of the composite separator 10, as shown in FIG. 1B.

The collector substrate 50, which includes a collection face 54 onto which the first non-woven polymer fiber mat 22, 42 is fabricated, may be any electrically conductive structure known to skilled artisans that is compatible with the electrospinning operation. For instance, the collector substrate 50 may be a generally flat metal layer, such as a thin metal sheet or metal foil, and may be constructed from any of a wide range of metals and alloys including aluminum, stainless steel, and copper, to name but a few examples. The metal layer does not have any particular thickness constraints. Although in many instances the thickness of the metal layer ranges anywhere from about 10 μm and about 1 mm. The use of a metal layer as the collector substrate 50 permits the composite separator 10 to be formed on, and then removed from, the collection face 54 before being incorporated into an electrochemical battery cell of a lithium ion battery. The composite separator 10 may be referred to as "free standing" if formed in this manner since the separator 10, once removed from the collector substrate 50, is an autonomously handleable structure.

In another embodiment, as shown in FIG. 4, the collector substrate 50 may be an electrode integral segment 56. The electrode integral segment 56 may include an electrode 58 and a metallic current collector 60 situated underneath—and in direct interfacial contact with—the electrode 58 opposite the collection face 54. An exposed face 62 of the electrode 58 may constitute the collection face 54 of the collector substrate 50. And any type of electrode material may be used to make the electrode 58. It should be noted, moreover, that other components may be included in the electrode integral segment 56 adjacent to the underlying metallic current collector 60 even though not specifically shown here. An example of such a component is another electrode similar in composition to the electrode 58 situated above the current collector 60 or, alternatively, some other practical component.

The electrode 58 may be composed as either a negative electrode or a positive electrode. The compositions associated with each of these electrodes are able to intercalate and de-intercalate lithium ions. They are also formulated to achieve a functional difference—namely, that the two electrodes store intercalated lithium at different electrochemical potentials relative to a common reference electrode (typically lithium). In the construct of an electrochemical battery cell of a lithium ion battery, the negative electrode stores intercalated lithium at a lower electrochemical potential (i.e., a higher energy state) than the positive electrode such that an electrochemical potential difference somewhere between about 2.5 V and about 5 V typically exists between the electrodes, depending on their exact compositions, when the negative electrode is lithiated. These attributes of the negative and positive electrode compositions permit the reversible transfer of lithium ions between the two electrodes either spontaneously (discharge phase) or through the application of an external voltage (charge phase) during operational cycling of the electrochemical battery cell. The thickness of the electrode 58 is preferably between about 30 μm and about 150 μm.

A negative electrode is preferably constructed from a lithium host material such as, for example, graphite, silicon, or lithium titanate. The lithium host material may be intermingled with a polymeric binder material to provide the negative electrode with structural integrity and, optionally, a conductive fine particle diluent. The lithium host material is preferably graphite and the polymeric binder material is preferably one or more of polyvinyldiene fluoride (PVdF), an ethylene propylene diene monomer (EPDM) rubber, styrene butadiene rubber (SBR), a carboxymethoxy cellulose (CMC), polyacrylic acid, or mixtures thereof. Graphite is normally used to make the negative electrode because, on top of being relatively inert, its layered structure exhibits favorable lithium intercalation and deintercalation characteristics which help provide the electrochemical battery cell with a suitable energy density. Commercial forms of graphite that may be used to construct the negative electrode are available from Timcal Graphite and Carbon (headquartered in Bodio, Switzerland), Lonza Group (headquartered in Basel, Switzerland), and Superior Graphite (headquartered in Chicago, Ill.). The conductive diluent may be very fine particles of, for example, high-surface area carbon black.

A positive electrode is preferably constructed from a lithium-based active material that stores intercalated lithium at a higher electrochemical potential than the lithium host material used to make the negative electrode. The same polymeric binder materials (PVdF, EPDM, SBR, CMC, polyacrylic acid) and conductive fine particle diluent (high-surface area carbon black) that may be used to construct the negative electrode may also be intermingled with the lithium-based active material for the same purposes. The lithium-based active material is preferably a layered lithium transition metal oxide, such as lithium cobalt oxide ($LiCoO_2$) and nickel-magnesium-cobalt oxide [$Li(Ni_xMn_yCo_z)O_2$], a spinel lithium transition metal oxide, such as spinel lithium manganese oxide ($LiMn_2O_4$), lithium iron phosphate ($LiFePO_4$), or lithium fluorophosphate ($Li_2FePO_4F$). Some other suitable lithium-based active materials that may be employed as the lithium-based active material include lithium nickel oxide ($LiNiO_2$), lithium aluminum manganese oxide ($Li_xAl_yMn_{1-y}O_2$), and lithium vanadium oxide ($LiV_2O_5$), to name but a few alternatives. Mixtures that include one or more of these recited lithium-based active materials may also be used to make the positive electrode.

The metallic current collector 60 is preferably a thin and flexible metallic foil which contacts the electrode 58 over an appreciable interfacial surface area. Any metal that is capable of collecting and reversibly passing free electrons to and from the electrode 58 may be employed. The actual metal selected may depend on whether the electrode 58 is composed as a negative electrode or a positive electrode. If the electrode 58 is composed as a negative electrode, for instance, the metallic current collector 60 is preferably a copper foil. If, however, the electrode 58 is composed as a positive electrode, the metallic current collector 60 is preferably an aluminum foil. The thickness of the metallic current collector 60 is preferably between about 5 μm and about 20 μm regardless of whether the electrode 58 is composed as a negative or positive electrode. Other types of metal foils besides those just mentioned may of course be used, if desired.

The electrospinning apparatus 52 comprises a syringe 62 (sometimes referred to as an extruder or a fluid delivery system) having any suitable construction. The syringe 62 shown here includes a barrel 64 that defines an interior chamber 66 for holding a polymer liquid 68 conducive to electrospinning. A tubular nozzle 70 that fluidly communicates with the interior chamber 66 and tapers to a tip 72 protrudes from the barrel 64. The tip 72 defines a terminal orifice 74 of the nozzle 70. A plunger 76 that can move axially within the interior chamber 66 and apply pressure to the polymer liquid 68, thus forcing the polymer liquid 68 through the orifice 74 at a controllable flow rate, is located within the barrel 64. The plunger 76 includes a plunger head 78 radially sealed against the barrel 64 by an appropriate dynamic sealing element. Advancement of the plunger head 78 against the polymer liquid 68 contained in the interior chamber 66 is controlled by a metering device 80. The metering device 80 may be a programmable syringe pump 82, as shown, or it may be some other device that can affect axial motion of the plunger head 78 such as, for example, a system of one or more coordinated valves that can apply pneumatic gas pressure.

The polymer liquid 68 contained in the interior chamber 66 of the barrel 64 and the tubular nozzle 70 is preferably a solution or melt of the polymer material intended to be transformed into the polymer fiber(s) 28, 48. A solution may be employed as the polymer liquid 68 if a solvent that dissolves the selected polymer material is available. If such a solvent is readily available and its use is practical, the solution is prepared with a viscosity that ensures sufficient polymer chain entanglement is experienced between the dissolved polymer material during electrospinning Adequate polymer chain entanglement is believed to be the mechanism which allows the solution to be electrospun into the polymer fiber(s) 28, 48 without disbanding. And the degree of polymer chain entanglement achieved by the dissolved polymer material is generally positively correlated to the viscosity of the solution; that is, an increase in viscosity of the solution corresponds to an increase in polymer chain entanglement of the dissolved polymer material, and vice versa. The viscosity of the solution can be affected most easily by adjusting one or both of the concentration of polymer material in the solution or the average molecular weight of the polymer material. The compositional makeup of the polymer liquid 68, when in solution form, also determines its preferred temperature during electrospinning Some polymer solutions can be kept at room temperature while others need to be heated to keep the polymer material solvated.

A melt of the polymer material may be employed as the polymer liquid 68 if a solvent for the selected polymer material is not readily available or when a melt is preferred for some other practical reason. The melt is typically prepared with a viscosity that ensures adequate flowability during electrospinning Polymer chain entanglement is usually not an issue here since the melt is composed of essentially all polymer material. Managing the viscosity of the melt, as such, is focused primarily on making sure the melt can be effectively moved through the electrospinning apparatus 52 in the manner needed to electrospin the polymer fiber(s) 28, 48. The viscosity of the melt can be affected most easily by managing one or both of the average molecular weight of the polymer material or the temperature of the melt. The temperature of the melt when present within the electrospinning apparatus 52 is usually greater than room temperature and, in many instances, greater than about 100° C.

Regardless of whether the polymer liquid 68 is employed as a solution or a melt, those skilled in the art will know how to prepare, handle, and properly administer the polymer liquid 68 within the electrospinning apparatus 52 for a wide variety of polymer materials including those mentioned before. Some of those previously-mentioned polymer materials are nonetheless listed below in Table 1 along with at least one compatible solvent that may be used to prepare a solution, if desired, as well as an indication of which polymer materials are preferably employed in melt form.

TABLE 1

Polymer Materials and their Solvent(s) for Electrospinning

| Polymer Material | Solvent(s) and/or Melt |
| --- | --- |
| Polyimide (i.e., PEI) | NMP; DMF; CHCl$_3$ |
| Flouropolymer (i.e., PVdF) | NMP; DMF; MIK; DMP; AC |
| Polyester (i.e., PET) | TFA; DMC; Melt |
| Polysulfone (i.e., PSf, PES, PPSf, PAS) | NMP; DMF; THF |
| PAN | NMP; DMF; THF |
| Polyacrylate (i.e., PMMA) | NMP; DMF; DMSO; AC |
| Aliphatic PA (i.e., Nylon 6 and 6,6) | Aqueous Acetic Acid or Melt |
| Aromatic PA (i.e., Kevlar) | Sulfuric Acid |
| Polycarbonate (i.e., poly-bisA-carbonate) | NMP; DMF; DMSO |
| Polyurethane | NMP; DMF; DMSO |
| Liquid Crystal Polymer (i.e., Vectran) | Melt |

NMP = N-Methyl-2-Pyrrolidone
THF = Tetrahydrofuran
TFA = Trifluoroacetic Acid
MIK = Methyl Isobutyl Ketone
AC = Acetone
DMF = Dimethyl Formamide
DMSO = Dimethyl Sulfoxide
DMC = Dimethyl Chloride
DMP = Dimethyl Phthalate A high-voltage direct current (DC) energy supply 84 is preferably operatively engaged to the electrospinning apparatus 52 to facilitate the electrospinning operation. The high-voltage DC energy supply 84 is able to generate an electrical field between the electrospinning apparatus 52 and the collector substrate 50. The electric field may be generated, more specifically, by applying an electrical potential to the tip 72 of the nozzle 70 so that an electrical potential difference exists between the tip 72 and the collection face 54 of the collector substrate 50. Either the positive terminal, as shown in FIG. 2, or the negative terminal of the power supply 84 may deliver the applied electrical potential to the tip 72 through an electrode or other appropriate connection. Conversely, the collector substrate 50 may be grounded, which is the preferred arrangement and shown in FIG. 2, or coupled to a terminal of the opposite polarity from the one coupled to the electrospinning apparatus 52. The opposite polarity terminal, if used, may originate from the same power supply 84 or a different one.

The formation of the first non-woven polymer fiber mat 22, 42 begins by positioning the collection face 54 of the collector substrate 50 into alignment with the electrospinning apparatus 52. The tip 72 of the nozzle 70 is brought into close proximity—usually within about 5 to about 40 cm—to the collection face 54 during such positioning. The first non-woven polymer fiber mat 22, 42 is then formed by electrospinning the polymer fiber(s) 28, 48 onto the collection face 54. Electrospinning the polymer fiber(s) 28, 48 from the electrospinning apparatus 52 includes generating an electric field between the collector substrate 50 and the electrospinning apparatus 52, pushing the polymer liquid 68 through the orifice 74 defined in the tip 72 of the nozzle 70, and collecting the polymer fiber(s) 28, 48 on the collection face 54 of the collector substrate 50. The electrospinning process is conducted for as long as it takes to prepare the first non-woven polymer fiber mat 22, 42 with its desired thickness and porosity.

The electric field is preferably generated by the high-voltage DC power supply 84. This may involve applying an electrical potential—derived from either the positive or negative terminal of the power supply 84—to the tip 72 of the tubular nozzle 70 while, at the same time, grounding the collector substrate 50 or applying an electrical potential from a terminal of the opposite polarity to the one applied to the nozzle tip 72. The high-voltage DC power supply 84 is usually operated to administer an electrical potential difference between the electrospinning apparatus 52 and the collector substrate 50 that ranges anywhere from about 5 kV to about 50 kV and, more preferably, between about 10 kV and about 35 kV. The generated electric field can be strengthened or weakened by adjusting the electrical potential difference induced by the high-voltage DC power supply 84.

The polymer liquid 68 contained in the electrospinning apparatus 52 is preferably pushed through the orifice 74 by the plunger head 78—as governed by the metering device 80—to form a pendent droplet. This droplet is held at the tip 72 of the nozzle 70 by surface tension. An electrostatic force that counteracts surface tension is also induced in the droplet. The electrostatic force is induced by a combination of the mutual charge repulsion promoted by the electric field and the tendency of the charged liquid 68 in the droplet to gravitate towards the collector substrate 50 through the electric field. The strength of the electric field, moreover, which is controllable with the high-voltage DC power supply 84, can be controlled to induce an electrostatic force that causes the generally hemispherical surface of the pendant droplet to elongate into a conical shape known as a Taylor cone 86, which is illustratively depicted in FIG. 3.

Eventually the repulsive electrostatic force induced by the electric field overcomes the surface tension that holds the Taylor cone 86 intact at the tip 72 of the nozzle 70. This results in expulsion of the polymer liquid 68 from the Taylor cone 86. More specifically, an electrified jet 88 of the polymer liquid 68 is ejected from the Taylor cone 86 towards the collection face 54 of the collector substrate 50. Small bends in the ejected electrified jet 88 repel one another while moving through the electric field and initiate whipping of the jet 88. This whipping phenomenon, in turn, results in lengthening and thinning of the electrified jet 88 and, if present, solvent evaporation. The electrified jet 88—whether originally formed as a solution or a melt—eventually solidifies into the nanometer to micrometer diameter-sized polymer fiber(s) 28, 48, in flight, while traveling towards the collector substrate 50.

The polymer fiber(s) 28, 48 are collected on the collection face 54 of the collector substrate 50 and, over time, this collection builds up and materializes into the first non-woven polymer fiber mat 22, 42. Various structural aspects of the mat 22, 42 can be dictated by one or more process parameters associated with operation of the electrospinning apparatus 52. For example, the specific construction of the first non-woven polymer fiber mat 22, 42 may be influenced by the composition of the polymer liquid 68 (e.g., the materials selected, concentrations, temperatures, forms of the liquids, etc.), the flow rate of the polymer liquid 68 through the orifice 74 as prescribed by the metering device 80, the distance between the collection face 54 of the collector substrate 50 and the tip 72 the nozzle 70, the size of the tip 72 of the nozzle 70, and the strength of the electric field induced by the high-voltage DC power supply 84, to name but a few. Moreover, relative side-to-side and/or rotational movement between the nozzle 72 of the electrospinning apparatus 52 and the collection face 54 of the collector substrate 50 may be employed to ensure the first non-woven polymer fiber mat 22, 42 is deposited evenly on the collection face 54 or as otherwise intended. Relative movement of this kind can be effectuated by any appropriate mechanism including one or more of a conveyor belt, a rotating drum, a jig, controllable mounts for the electrospinning apparatus 52, and any other type of appropriate mechanism not specifically mentioned here.

The ceramic particles 32 are applied over the top surface of the first non-woven polymer fiber mat 22, 42. The size of the ceramic particles 32 and the quantity applied may be managed to prepare, as discussed earlier and shown generally in FIG. 1A, an intermediate ceramic particle layer 26 that will accumulate on the top surface 34 of the first non-woven polymer fiber mat 22 and remain situated between the top surface 34 of the first non-woven polymer fiber mat 22 and the bottom surface 36 of the second non-woven polymer fiber mat 24 after the second non-woven polymer fiber mat 24 is electrospun in place. Alternatively, however, the size of the ceramic particles 32 and the quantity applied may be managed to prepare, as shown generally in FIG. 1B, a dispersal 46 of the ceramic particles 32 within one or both of the first and second non-woven polymer fiber mats 42, 44 if the two mats 42, 44 are integrated together. Still further, it may be desired to produce some combination of the intermediate ceramic particle layer 26 and the ceramic particle dispersal 46; that is, the size and quantity of the ceramic particles 32 may be managed to form the intermediate ceramic particle layer 26 between the top and bottom surfaces of the first and second non-woven polymer fiber mats in one location, as well as to infiltrate one or both of the first and second non-woven polymer fiber mats to such an extent that the mats become integrated in another location. The ceramic particles 32 may be applied by any of a variety of techniques. For example, the ceramic particles 32 may be applied by spraying or coating a ceramic particle dispersion that includes water and/or an organic solvent, for example, as the continuous liquid phase, followed by removal of the liquid phase. The ceramic particles 32 could also be applied by electrospraying.

The second non-woven polymer fiber mat 24, 44 is formed over the first non-woven polymer fiber mat 22, 42 and the ceramic particles 32 by the electrospinning apparatus 52 (either the same one or a different one) in the same way as previously described. Specifically, for instance, the first non-woven polymer fiber mat 22, 42 and the applied ceramic particles 32, while still on the collector substrate 50, are brought into alignment with the electrospinning apparatus 52. The electrospinning apparatus 52 is then operated in conjunction with the high-voltage direct current (DC) energy supply 84 to generate polymer fiber(s) 28, 48 that are collected as the second non-woven polymer fiber mat 24, 44 with its prescribed thickness, porosity, and other structural characteristics. The polymer fiber(s) 28, 48 that make up the second non-woven polymer fiber mat 24, 44 may be the same or different from the polymer fiber(s) 28, 48 that make up the first non-woven polymer fiber mat 22, 42.

Figure 5:
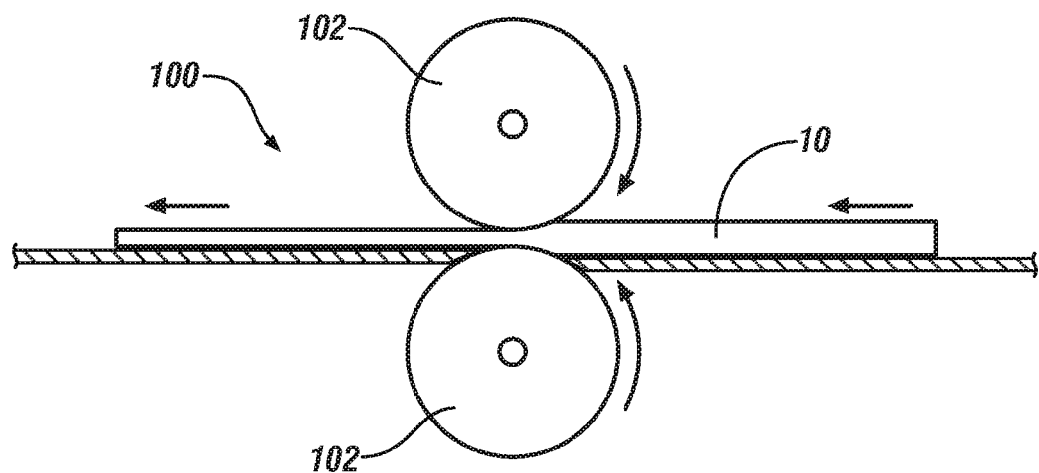
FIG. 5 is a generalized and schematic illustration of a calendaring apparatus that may be used to calendar the composite separator.

After the composite separator 10 is formed, it may be removed from the collector substrate 50 by peeling or some other appropriate technique if the composite separator 10 is intended to be fabricated as "free-standing." Additional steps may now be performed on the composite separator 10 if desired. For example, as shown in FIG. 5, the composite separator 10 may be calendared in a calendaring apparatus 100 to improve its mechanical performance and dimensional uniformity. The calendaring apparatus 100 includes at least a pair of counter-rotating rollers 102 between which the composite separator 10 can be passed. The rollers 102 are preferably heated and, together, they exert a pressure that compresses the composite separator 10 as it passes between them. Other acts in addition to, or in lieu of, the calendaring act just described may also be practiced even though such acts are not specifically discussed here. The composite separator 10 may also be retained on the collector substrate 50 and the entire structure calendared if the substrate 50 is constructed as the electrode integral segment 56 illustrated, for instance, in FIG. 4.

Figure 6:
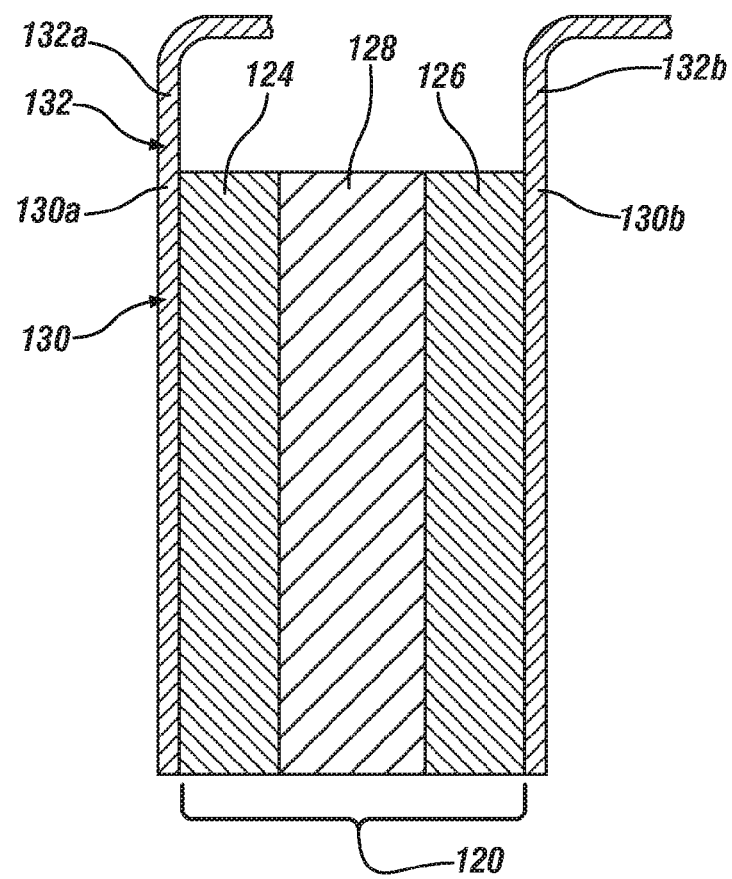
FIG. 6 is a generalized and schematic cross-sectional illustration of an electrochemical battery cell formed with the composite separator shown schematically in FIG. 1.

The composite separator 10 may be incorporated into an electrochemical battery cell 120 of a lithium ion battery as shown, for example, in FIG. 6. The electrochemical battery cell 120 comprises a negative electrode 124 and a positive electrode 126 separated by a separator 128. To help efficiently pass an electric current between the two electrodes 124, 126, a metallic current collector 130 may be situated on each side of the electrochemical battery cell 120. More specifically, a negative-side metallic current collector 130a supports the negative electrode 124 and a positive-side metallic current collector 130b supports the positive electrode 126. The metallic current collectors 130a, 130b may include tabs 132a, 132b for accommodating an electrical connection. Each of the metallic current collectors 130a, 130b preferably engages their respective electrodes 124, 126 over an appreciable interfacial surface area to facilitate the efficient collection and distribution of free electrons. The preferred constructions of the negative and positive electrodes 124, 126 and the metallic current collectors 130a, 130b are the same as described earlier with respect to the electrode integral segment 56 shown in FIG. 4 and, as such, need not be repeated here.

The separator 128 is a thin and electrically insulative mechanical barrier layer that physically separates the confronting electrodes 124, 126 to prevent a short-circuit in the electrochemical battery cell 120. The composite separator 10 may constitute the entire separator 128 or, alternatively, it may constitute part of the separator 128 if, for example, the separator 128 is combined with another material layer. Using the composite separator 10 as all or part of the separator 128 may be helpful for at least several reasons. First, the composite separator 10 has a porosity sufficient to accommodate a liquid electrolyte suitable to communicate lithium ions. Second, the composite separator 10 is thermally stable enough that a temperature spike above 80° C., and even above 100° C., in the electrochemical battery cell 120 can be endured by the separator 128 without a significant sacrifice in functionality. And finally, dimensional shrinkage of the composite separator 10 can be avoided because significant stretching is not required to fabricate the separator 10 with its porosity characteristics.

The composite separator 10 may be incorporated into the electrochemical battery cell 120 in several different ways depending on whether the separator 10 is "free-standing" or retained on the electrode integral segment 56. If free-standing, the composite separator 10 may be situated and pressed between the negative and positive electrodes 124, 126 in any suitable manner. If retained on the electrode integral segment 56, the electrochemical battery cell 120 may be formed by pressing the electrode integral segment 56 and the retained composite separator 10 against another electrode composed to function as the opposite of the electrode 58 included in the electrode integral segment 56, with the composite separator 10 being situated between the two electrodes. That is, if the electrode 58 included in the electrode integral segment 56 is composed as a negative electrode, then the other electrode combined with the electrode integral segment 56 and the retained composite separator 10 is composed as a positive electrode, and vice-versa.

The separator 128, and thus the composite separator 10, is soaked with a liquid electrolyte when present in the electrochemical battery cell 120. The liquid electrolyte is able to communicate lithium ions, and is preferably a lithium salt dissolved in a non-aqueous solvent. Some suitable lithium salts that may be used to make the liquid electrolyte include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

Figure 7:
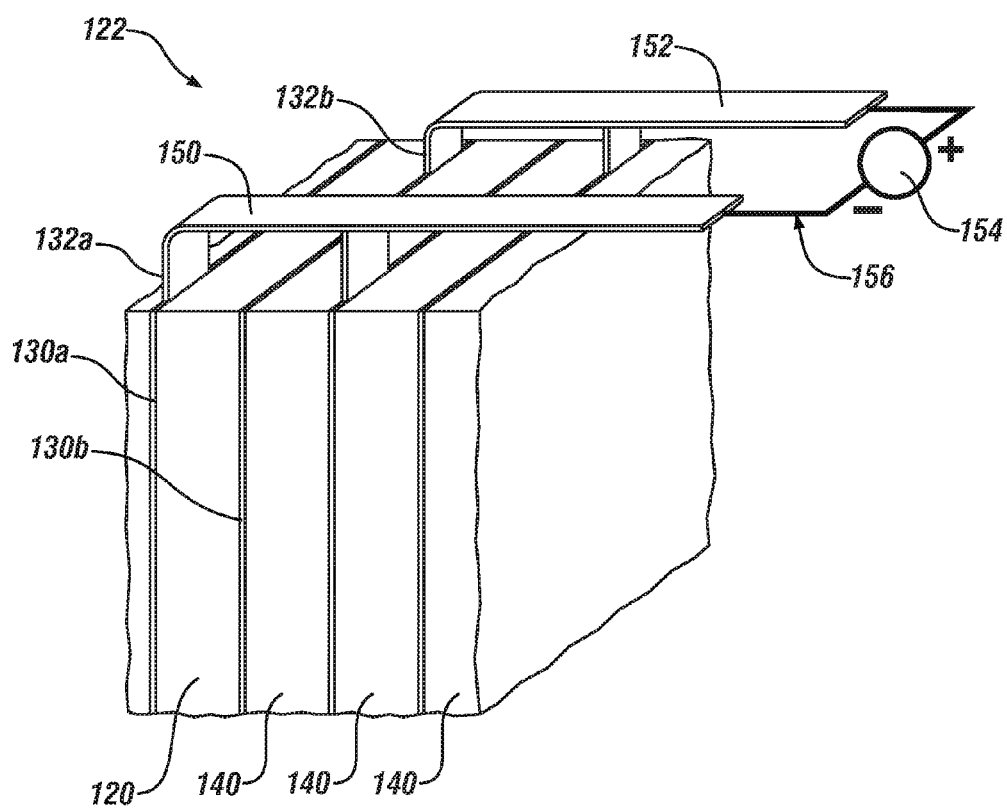
FIG. 7 is a generalized and schematic illustration of a lithium ion battery that includes the electrochemical battery cell depicted in FIG. 6.

The electrochemical battery cell 120 may be stacked up with and connected to a plurality of other electrochemical battery cells, each identified generally as numeral 140, to assemble a lithium ion battery 122, as shown in FIG. 7 (although winding and overlapping one continuous cell 120 around a core to form a cylindrical lithium ion battery may also practiced). The generally-identified electrochemical battery cells 140 may be structurally the same, and formed in the same manner, as the electrochemical battery cell 120 just described, or they may be different. Anywhere from five to fifty of the electrochemical battery cells 120, 140 are typically connected in parallel—although a series connection is also permitted—to form the lithium ion battery 122. Several of the lithium ion batteries 122 may then be connected in series or in parallel to assemble a lithium ion battery pack (not shown) with the voltage and current capacity demanded for a particular application. For instance, anywhere from twenty to two hundred and fifty of the lithium ion batteries 122 are often included in a lithium ion battery pack if the battery pack is intended to be used—either alone or in combination with other lithium ion battery packs—as an on-board power source in a hybrid-electric vehicle (HEV), an extended range electric vehicle (EREV), or some other similar vehicle. While the electrochemical battery cells 120, 140 incorporated into the lithium ion battery 122 shown in FIG. 7 are rectangularly-shaped and stacked side-by-side in a modular prismatic configuration, it should be understood that the lithium ion battery 122 shown here is only a schematic illustration. FIGS. 6 and 7 are not intended to inform the relative sizes of the electrochemical battery cells' components or to limit the wide variety of structural configurations the lithium ion battery 122 may assume.

A negative terminal 150 and a positive terminal 152 of the lithium ion battery 122 may be connected to an electrical device 154 as part of an interruptible circuit 156 established between the negative electrodes and the positive electrodes of the several electrochemical battery cells 120, 140. The electrical device 154 may be a wide variety of electrical loads and power-generating devices. An electrical load is a power-consuming device that is powered fully or partially by the lithium ion battery 122. Conversely, a power-generating device is one that charges or re-powers the lithium ion battery 122 through an applied external voltage. The electrical load and the power-generating device can be the same device in some instances. For example, the electrical device 154 may be an electric motor for a HEV or an EREV that is designed to draw an electric current from the lithium ion battery 122 during acceleration and provide a regenerative electric current to the lithium ion battery 122 during deceleration. The electrical load and the power-generating device can also be different devices. For example, the electrical load may be an electric motor for a HEV or an EREV and the power-generating device may be an AC wall outlet, an internal combustion engine, and/or a vehicle alternator.

The lithium ion battery 122 can provide a useful electrical current to the electrical device 154. An electrical current can be produced by way of reversible electrochemical reactions that occur in the electrochemical battery cells 120, 140 when the interruptible circuit 156 is closed to connect the negative terminal 150 and the positive terminal 152 at a time when the negative electrodes contain intercalated lithium (i.e., battery discharge). The electrochemical potential difference between the negative electrode and the positive electrode in each cell 120, 140—approximately 2.5 to 5V—drives the oxidation of intercalated lithium contained in the negative electrodes. Free electrons produced by this oxidation reaction are collected by the negative-side current collectors 130a and are supplied to the negative terminal 150. A flow of free electrons is harnessed and directed through the electrical device 154 from the negative terminal 150 to the positive terminal 152 and eventually to the positive electrodes by way of the positive-side current collectors 130b. Lithium ions, which are also produced at the negative electrodes, are concurrently carried through the separators by the liquid electrolyte in route to the positive electrodes as well. The flow of free electrons through the electrical device 154 from the negative terminal 150 to the positive terminal 152 can be continuously or intermittently provided until the negative electrodes are depleted of intercalated lithium or the capacity of the electrochemical battery cells 120, 140 is otherwise spent.

The lithium ion battery 122 can be charged or re-powered at any time by applying an external voltage to the electrochemical battery cells 120, 140. Application of the external voltages drives the reverse the electrochemical reactions that occur during discharge. The applied external voltage compels the otherwise non-spontaneous oxidation of intercalated lithium contained in the positive electrodes to produce free electrons and lithium ions. The free electrons are collected by the positive-side current collectors 130b and are supplied to the positive terminal 152. A flow of the free electrons is directed to the negative terminal 150, and eventually to the negative electrodes, by way of the negative-side current collectors 130a. The lithium ions are concurrently carried back through the separators by the liquid electrolyte towards the negative electrodes as well. The lithium ions and the free electrons eventually reunite and replenish the negative electrodes with intercalated lithium to prepare the electrochemical battery cells 120, 140 for another discharge phase. The external voltage may originate from the electrical device 154 as previously mentioned or by some other suitable mechanism.

The above description of preferred exemplary embodiments is merely descriptive in nature; it is not intended to limit the scope of the claims that follow. Each of the terms used in the appended claims should be given its ordinary and customary meaning unless specifically and unambiguously stated otherwise in the specification.

The invention claimed is:

1. A method of making a composite separator for disposition between a negative electrode and a positive electrode in an electrochemical battery cell of a lithium ion battery, the method comprising:
   (a) providing a collector substrate that includes a collection face;
   (b) electrospinning a first non-woven polymer fiber mat onto the collection face of the collector substrate, the first non-woven polymer fiber mat comprising a fibrous web of one or more polymer fibers and having a top surface;
   (c) applying ceramic particles over the top surface of the first non-woven polymer fiber mat; and
   (d) electrospinning a second non-woven polymer fiber mat over the first non-woven polymer fiber mat and the ceramic particles to form a composite separator, the second non-woven polymer fiber mat comprising a fibrous web of one or more polymer fibers that are the same type as, or different from, the one or more polymer fibers in the first non-woven polymer fiber mat, wherein the composite separator includes a first major face provided by the first non-woven polymer fiber mat and a second major face provided by the second non-woven polymer fiber mat, the first and second major faces defining a thickness of the separator, and further comprising a first edge region adjacent to the first major face, a second edge region adjacent to the second major face, and an intermediate region between the first and second edge regions, the intermediate region comprising a greater weight percent of ceramic particles than each of the first and second edge regions based on the total weight of the ceramic particles and the one or more electrospun polymer fibers in each region.

2. The method set forth claim 1, wherein the polymer fiber(s) in the first non-woven polymer fiber mat and the second non-woven polymer fiber mat are comprised of at least one of a polyolefin, a polyamic acid, a polyimide, a polyamide, a polysulfone, a polyester, a fluoropolymer, a polyacrylate, a polycarbonate, a polyurethane, or a mixture thereof.

3. The method set forth in claim 1, wherein the polymer fiber(s) in the first non-woven polymer fiber mat and the second non-woven polymer fiber mat are comprised of at least one of polypropylene, polyethylene, polyetherimide, polyhexamethylene adipamide, polycaprolactam, polyparaphenylene terephthalamide, standard polysulfone, polyarylsulfone, polyethersulfone, polyphenylsulfone, polyethylene terephthalate, polyvinylidene fluoride, poly(methyl methacrylate), polyacrylonitrile, poly(bisphenol A-carbonate), or a mixture thereof.

4. The method set forth in claim 1, wherein the polymer fiber(s) in the first non-woven polymer fiber mat and the second non-woven polymer fiber mat are comprised of at least one of polyethylene terephthalate, polyvinylidene fluoride, polyacrylonitrile, polyetherimide, standard polysulfone, an aromatic polyamide, a liquid crystal polymer, a or mixture thereof.

5. The method set forth in claim 1, wherein the ceramic particles comprise at least one of barium titanate or strontium-doped barium titanate.

6. The method set forth in claim 1, wherein the composite separator has a thickness that ranges from about 5 μm to about 50 μm.

7. The method set forth in claim 1, wherein each of steps (b) and (d) comprise:
generating an electric field between the collector substrate and an electrospinning apparatus;
pushing a polymer liquid conducive to electrospinning through an orifice of the electrospinning apparatus so that an electrically charged jet of the polymer liquid is ejected towards the collector substrate; and
collecting the one or more polymer fibers of the first non-woven polymer fiber mat on the collection face of the collector substrate (step (b)) or collecting the one or more polymer fibers of the second non-woven polymer fiber mat over the first non-woven polymer fiber mat and the ceramic particles (step (d)).

8. The method set forth in 1 further comprising:
removing the composite separator from the collector substrate;
calendering the composite separator; and
incorporating the composite separator into an electrochemical battery cell of a lithium ion battery that includes a positive electrode and a negative electrode, the first edge region of the composite separator engaging a surface of one of the positive or negative electrodes and the second edge region of the composite separator engaging a confronting surface of the other electrode.

9. The method set forth in claim 1, wherein the collector substrate comprises an electrode composed as either a negative electrode or a positive electrode for an electrochemical battery cell of a lithium ion battery, and further comprising:
pressing the collector substrate and the composite separator retained on the substrate together with another electrode complimentary to the electrode included in the collector substrate, and wherein the composite separator is situated between the electrodes.

10. The method set forth in claim 1, wherein a quantity and size of the ceramic particles are applied over the top surface of the first non-woven polymer fiber mat to form an intermediate ceramic particle layer that contacts the top surface of the first non-woven polymer fiber mat and a bottom surface of the second non-woven polymer fiber mat, and wherein the intermediate ceramic particle layer separates the first and second non-woven polymer fiber mats.

11. The method set forth in claim 1, wherein a quantity and size of the ceramic particles are applied over the top surface of the first non-woven polymer fiber mat to form a dispersal of ceramic particles in one or both of the first and second non-woven polymer fiber mats and to permit the first and second non-woven polymer fiber mats to integrate together, the dispersal of ceramic particles being concentrated within the composite separator and forming a concentration gradient that diminishes towards a first major face and a second major face of the composite separator that define a thickness of the composite separator.

12. A method of making a composite separator for disposition between a negative electrode and a positive electrode in an electrochemical battery cell of a lithium ion battery, the method comprising:
(a) providing a collector substrate that includes a collection face;
(b) electrospinning a first non-woven polymer fiber mat onto the collection face of the collector substrate, the first non-woven polymer fiber mat comprising a fibrous web of one or more polymer fibers and having a top surface;
(c) applying ceramic particles over the top surface of the first non-woven polymer fiber mat to form an intermediate ceramic particle layer; and
(d) electrospinning a second non-woven polymer fiber mat over the intermediate ceramic particle layer, the second non-woven polymer fiber mat comprising a fibrous web of one or more polymer fibers and having a bottom surface, wherein the bottom surface of the second non-woven polymer fiber mat and the top surface of the first non-woven polymer fiber mat are separated by the intermediate ceramic particle layer, and wherein the intermediate ceramic particle layer comprises a greater weight percent of ceramic particles than each of the first non-woven polymer fiber mat and the second non-woven polymer fiber mat, the weight percent of ceramic particles in each of the first non-woven polymer fiber mat, the intermediate ceramic particle layer, and the second non-woven polymer fiber mat being based on the total weight of the ceramic particles and polymer fibers therein.

13. The method set forth in claim 12, wherein each of steps (b) and (d) comprise deriving the one or more polymer fibers in the first and second non-woven polymer fiber mats, respectively, from an electrified jet of a polymer liquid conducive to electrospinning.

14. The method set forth in claim 12, wherein each of steps (b) and (d) comprise:
generating an electric field between the collector substrate and an electrospinning apparatus;
pushing a polymer liquid conducive to electrospinning through an orifice of the electrospinning apparatus so that an electrically charged jet of the polymer liquid is ejected towards the collector substrate; and
collecting the one or more polymer fibers of the first non-woven polymer fiber mat on the collection face of the collector substrate (step (b)) or collecting the one or more polymer fibers of the second non-woven polymer fiber mat on the intermediate ceramic particle layer applied over the first non-woven polymer fiber mat (step (d)).

15. The method set forth in claim 14, wherein the polymer liquid conducive to electrospinning comprises a polyolefin, a polyamic acid, a polyimide, a polyamide, a polysulfone, a polyester, a fluoropolymer, a polyacrylate, a polycarbonate, a polyurethane, or mixtures thereof.

16. The method set forth in claim 12, wherein the collector substrate comprises an electrode composed as either a positive electrode or a negative electrode for an electrochemical battery cell of a lithium ion battery, and wherein the electrode is exposed at the collection face.

17. The method set forth in claim 12, wherein the polymer fiber(s) in the first non-woven polymer fiber mat and the second non-woven polymer fiber mat have a diameter in the range of about 10 nm to about 10 μm.

18. The method set forth in claim 12, further comprising:
(e) incorporating the composite separator into an electrochemical battery cell of a lithium ion battery such that the composite separator physically separates and electrically insulates a negative electrode and a positive electrode, the first non-woven polymer fiber mat of the composite separator engaging a surface of one of the positive or negative electrodes and the second non-woven polymer fiber mat of the composite separator engaging a confronting surface of the other electrode.

19. A composite separator for use in an electrochemical battery cell of a lithium ion battery, the composite separator comprising:
- a first major face and a second major face that define a thickness of the composite separator;
- a first edge region adjacent to the first major face, the first edge region comprising one or more electrospun polymer fibers;
- a second edge region adjacent to the second major face, the second edge region comprising one or more electrospun polymer fibers; and
- an intermediate region situated between the first edge region and the second edge region that comprises ceramic particles, wherein the intermediate region comprises a greater weight percent of ceramic particles than each of the first and second edge regions, based on the total weight of the ceramic particles and the one or more electrospun polymer fibers in each region, and wherein each of the first and second edge regions comprises a greater weight percent of the one or more electrospun polymer fibers than the ceramic particles, also based on the total weight of the one or more electrospun polymer fibers and the ceramic particles in their respective regions.

20. The composite separator set forth in claim 19, wherein the ceramic particles comprise at least one of barium titanate or strontium-doped barium titanate.

* * * * *